United States Patent Office 3,579,526
Patented May 18, 1971

3,579,526
PREPARATION OF THIENOPYRIDINES
Le Roy H. Klemm and Joseph Shabtai, Eugene, Oreg.,
and David R. McCoy, Wappingers Falls, N.Y., assignors
to Research Corporation, New York, N.Y.
No Drawing. Filed Nov. 13, 1968, Ser. No. 775,534
Int. Cl. C07d 31/50
U.S. Cl. 260—294.8                                    13 Claims

ABSTRACT OF THE DISCLOSURE

Thienopyridines are prepared by the decomposition of benzyl 2-(pyridyl) ethyl sulfides. The thermal decomposition may be catalytic or non-catalytic and is desirably carried out at a temperature in the range 500–700° C. Thieno[3,2-b] pyridine is prepared by the thermal decomposition of benzyl 2-(2-pyridyl) ethyl sulfide and thieno[2,3-c] pyridine is prepared by the thermal decomposition of benzyl 2-(4-pyridyl) ethyl sulfide.

The invention described herein was made in the course of work under a grant or award from the Department of Health, Education, and Welfare.

This invention relates to the preparation of thienopyridines, such as thieno[3,2-b] pyridine and thieno[2,3-c] pyridine.

There are six theoretically possible parent thienopyridine compounds; these include thieno[2,3-b] pyridine, thieno[3,2-b] pyridine, thieno[2,3-c] pyridine and thieno[3,2-c] pyridine. Until recently these materials were obtained only in low yields, about 1–6%, from available starting materials. For example, thieno[3,2-b] pyridine was first synthesized, about 1.6% yield, by L. H. Klemm and D. Reed by passing 2-vinylpyridine and hydrogen sulfide through a packed tube at an elevated temperature, see J. Org. Chem. 25, 1816 (1960). Thieno [2,3-c] pyridine was first synthesized at about 3% yield by W. Herz and L. Tsai from thiophene-2-aldehyde by means of the Pomeranz-Fritsch reaction, see J. Amer. Chem. Soc., 75 5122 (1953).

It is an object of this invention to provide a relatively simple process for the production of thienopyridines.

Another object of this invention is to provide a process for the production of thienopyridines in substantially improved yields.

Yet another object of this invention is to provide a commercial process for the production or synthesis of thienopyridines.

How these and other objects of this invention are achieved will become apparent in the light of the accompanying disclosure. In at least one embodiment of the practice of this invention at least one of the foregoing objects is achieved.

It has been discovered that thienopyridines can be synthesized by the decomposition of benzyl 2-(pyridyl) ethyl sulfides. In accordance with one embodiment it has been discovered that thieno[3,2-b] pyridine is synthesized by the decomposition of benzyl 2-(2-pyridyl) ethyl sulfide. In accordance with another embodiment it has been discovered that thieno[2,3-c] pyridine is synthesized by the decomposition of benzyl 2-(4-pyridyl) ethyl sulfide. These two embodiments of the practice of this invention are of special practical interest because of the ease of forming the starting sulfides by chemical reaction of 2-vinylpyridine and 4-vinylpyridine, respectively, with commerically available benzyl mercaptan. Other vinyl pyridines with substituents on the pyridine rings may be reacted with benzyl mercaptan to provide the sulfides useful as starting materials in accordance with this invention. Suitable such substituted vinylpyridines would include the vinylpyridines with substituents in the 4-, 5- and/or 6-positions of 2-vinylpyridine and in the 2-, 3- and/or 6-positions of 4-vinylpyridine. Such materials would yield corresponding thienopyridines in accordance with this invention with substituents present in the pyridinoid nucleus. Suitable substituent groups would include methyl, fluoro, chloro and phenyl groups. 2-vinylquinoline and 4-vinylquinoline are special cases of substituted vinylpyridines and would yield benzothienopyridines having the formulas,

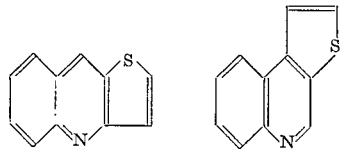

respectively, in accordance with this invention.

The synthesis of thienopyridine from benzyl 2-(pyridyl) ethyl sulfides in accordance with this invention is carried out by the decomposition of the benzyl 2-(pyridyl) ethyl sulfide. Desirably, the thermal decomposition is carried out at a temperature range from about 500° C. to about 700° C., more or less. Especially satisfactory results or yields of thienopyridines are achieved by carrying out the thermal decomposition or thermolytic cyclization at a temperature in the range from about 580° C. to about 620° C. or up to about 645° C. For example, thieno[2,3-c] pyridine is recoverable by the thermal decomposition of benzyl 2-(4-pyridyl) ethyl sulfide in the mol percent yields 40, 58, 30, 24 and 15, at temperatures of 580° C., 605° C., 620° C., 635° C. and 645° C., respectively. Also, thieno[3,2-b] pyridine is recoverable by the decomposition of benzyl 2-(2-pyridyl) ethyl sulfide in the mol percent yields of 25, 27 and 17, at temperatures of 580° C., 600° C., and 620° C., respectively.

Although the synthesis of thienopyridines in accordance with the practice of this invention can be carried out in the absence of a catalyst or catalytic agent, a suitable catalyst or catalytic agent may be present and could facilitate the production of the thienopyridines, particularly at a lower temperature. Also, the production of the thienopyridines in accordance with the practices of this invention is usefully carried out in the presence of gaseous hydrogen sulfide or gaseous nitrogen.

The thienopyridines, particularly thieno[3,2-b] pyridine and thieno[2,3-c] pyridine, are useful materials in the preparation of dyes, as insecticides, herbicides, pesticides and as lubricating oil additives.

The following examples are illustrative of the practice of this invention.

EXAMPLE 1

SYNTHESES OF BENZYL 2-(PYRIDYL)ETHYL SULFIDES
(a) BENZYL 2-(4-PYRIDYL)ETHYL SULFIDE (VIII)

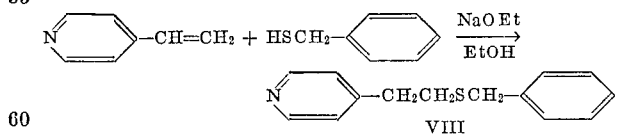

The solution obtained by dissolving 0.75 g. of metallic sodium in 50 ml. of ethanol was cooled (0–10° C.) and stirred while 35 g. (0.28 mole) of benzyl mercaptan was added and then 30 g. (0.28 mole) of freshly distilled 4-vinylpyridine was added over a period of 30 minutes. Additional ethanol (30 ml.) was added and the solution was allowed to stand at room temperature for 2.5 hr. Evaporation of the solvent gave 63 g. (98% yield) of crude benzyl 2-(4-pyridyl)ethyl sulfide (VIII) as a green liquid. This material analyzed: NMR data (in CCl$_4$, at 60 mHz., tetramethylsilane as standard): δ 2.4–2.8 p.p.m.

(multiplet, PyCH$_2$CH$_2$S—), 3.62 (singlet, —SCH$_2$C$_6$H$_5$), 6.90 (intensity-reversed doublet of doublets, apparent coupling constants J=6.2 Hz. and J=1.9 Hz., β-protons on pyridine ring), 7.23 (singlet, C$_6$H$_5$—), 8.3h (intensity-reversed doublet of doublets, apparent coupling constants J=6.2 Hz. and J=1.9 Hz., α-protons on pyridine); integration—total aromatic protons: total aliphatic protons; calc. 1.50:1, found 1.55:1.

The picrate of VIII was formed in ethanol and recrystallized repeatedly from this same solvent to give a yellow powder, M.P. 112.5–113° C.

*Analysis.*—Calcd. for C$_{20}$H$_{18}$N$_4$O$_7$S (percent): C, 52.39; H, 3.96; N, 12.22; S, 7.00. Found (percent): C, 52.63; H, 4.08; N, 12.37; S, 7.08.

(b) Benzyl 2-(2-pyridyl) ethyl sulfide  (XI)

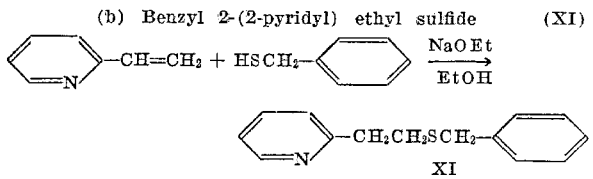

Following the same procedure employed to prepare VIII, except that 2-vinylpyridine was used instead of 4-vinylpyridine, there was obtained 63 g. (98% yield) of crude benzyl 2-(2-pyridyl) ethyl sulfide (XI) as a yellow liquid. This material analyzed: NMR data (same conditions as for VIII): δ=2.5–3.2 p.p.m. (multiplet, 4 H, PyCH$_2$CH$_2$S—), 3.59 (singlet, 2 H, —SCH$_2$C$_6$H$_5$), 6.7–7.6 (multiplet—including a sharp singlet at 7.18, 8H; C$_6$H$_5$— for singlet, plus protons at C-3, C-4, and C-5 on pyridine ring), 8.3–8.6 (multiplet, 1 H, proton at C-6 on pyridine ring).

The picrate of XI was formed in absolute ethanol and recrystallized repeatedly from this same solvent to give canary yellow prisms, M.P. 104.5–105.5° C.

*Analysis.*—Calcd. for C$_{20}$H$_{18}$N$_4$O$_7$S (percent): C, 52.39; H, 3.96; N, 12.22; S, 7.00. Found (percent): C, 52.11; H, 3.93; N, 12.20; S, 6.60.

Thermolytic cyclizations of the benzyl 2-(pyridyl) ethyl sulfides in accordance with this invention were conducted in a flow system which consisted of a vertically mounted Vycor tube, 75 x 3.0 cm. (I.D.), provided a the top with a constant-rate dropping funnel and a gas inlet and at the bottom with a receiver cooled in ice-water. The reaction tube was heated in a furnace equipped with a main heating coil and two auxiliary coils, individually controlled and wrapped in such manner that an isothermal zone in the range of 500–700° C. of 45±5 cm. in length could be established near the central portion of the reaction tube. The temperature at various locations along the internal length of the furnace was measured, to an accuracy estimated at ±3° C., by means of a movable thermocouple. The portion of the reaction tube which was located in the isothermal zone was filled with ³⁄₃₂-inch (I.D.) Pyrex glass helices.

EXAMPLE 2

Thieno[2,3-c]pyridine (III)

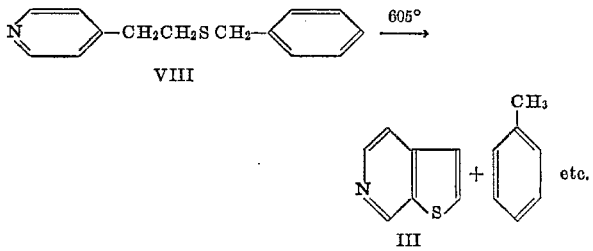

A stream of hydrogen sulfide at a flow rate of 10 liters/hr. was passed into the reaction tube while it was heated to 605° C. and stabilized over a period of 1 hr. at this temperature, and during the reaction proper. Fifty g. of preceding benzyl 2-(4-pyridyl)ethyl sulfide (VIII) were then added dropwise to the reaction tube at a uniform rate over a period of 1.7 hr. Heating and flow of gas were discontinued. Acetone washings of the cold glass helices were evaporated to leave a residue (2.0 g.) which was combined with the dark brown liquid (34.3 g.) collected in the receiver. A solution of this product in ether was extracted with 10% hydrochloric acid. The acid extract was basified with sodium hydroxide and extracted with ether. Evaporation of this second ether extract left 25.2 g. of crude, basic product, which was fractionally distilled to give 18.7 g. of yellow liquid, B.P. 73–75° C. (0.5 mm.), found to contain 91% of III by VPC analysis using a stationary phase of 10% Carbowax 20M on Chromosorb P and temperature programming over the range 100–180° C. The calculated yield is thus (18.7) (0.91) or 17 g. (58 mole percent yield, as based on VIII used). On cooling, a large part of this fraction crystallized. One crystallization of the fraction from hexane gave white prisms, M.P. 59–60° C. [reported M.P. 54–55° C. for a sample purified by sublimation; W. Herz and L. Tsai, J. Amer. Chem. Soc., 75, 5122 (1953)]. The VPC retention volumes of crystalline samples made by the two methods were identical, as were NMR spectra.

A picrate of the thermolysis product melted at 204–206° C. (after recrystallization from ethanol); while a picrate of the product from the Herz and Tsai procedure melted at 205.5–206.5° C.; mixture M.P. 204.5–206.5° C.

It was found that nitrogen gas could be used in place of hydrogen sulfide in the thermolysis process. Neutral by-products which remained in the organic layer from acid extraction during work-up were identified as toluene by IR and NMR analysis, stilben (NMR analysis, M.P., mixture M.P. with an authentic sample), and 2-phenylthianaphthene (XII).

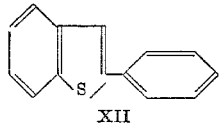

XII was isolated by chromatography on alumina and identified by comparison with an authentic sample [prepared by the method of A. W. Horton, J. Org. Chem., 14, 761 (1949)] by means of NMR spectra and mixture M.P. determination.

EXAMPLE 3

Thieno[3,2-b]pyridine (II)

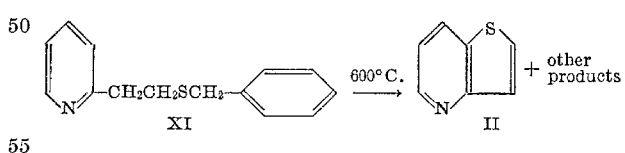

Following the same procedure as in the thermolytic cyclization of VIII to form III, except that XI was used in place of VIII and the reaction temperature was 600° C., there was obtained a crude basic fraction which contained 28% of II (27 mole percent yield) as determined by vapor phase chromatography. Concentration of this fraction and chromatography by means of Alcoa F-20 alumina and benzene gave purified II, identical in VPC retention volume and NMR spectrum with an authentic sample prepared from 2-vinylpyridine and hydrogen sulfide (L. H. Klemm and D. Reed, J. Org. Chem., 25, 1816 (1960).

As will be apparent to those skilled in the art in the light of the foregoing disclosure, many modifications, alterations and substitutions are possible in the practice of this invention without departing from the spirit or scope thereof.

We claim:

1. A method of preparing thieno[3,2-b]pyridine or thieno[2,3-c]pyridine which consists of subjecting benzyl 2-(2- or 4-pyridly ethyl sulfide to thermal decomposition and recovering the resulting produced thienopyridine.

2. A method in accordance with claim 1 wherein said thermal decomposition is carried out in the presence of hydrogen sulfide.

3. A method in accordance with claim 1 wherein said thermal decomposition is carried out at a temperature in the range from about 500° C. to about 700° C.

4. A method in accordance with claim 1 wherein said thermal decomposition is carried out at a temperature in the range from about 580° C. to about 620° C.

5. A method of producing thieno[3,2-b]pyridine which comprises subjecting benzyl 2-(2-pyridyl)ethyl sulfide to thermal decomposition and recovering the resulting produced thieno[3,2-b]pyridine.

6. A method in accordance with claim 5 wherein said thermal decomposition is carried out in the persence of hydrogen sulfide.

7. A method in accordance with claim 5 wherein said thermal decomposition is carried out at a temperature in the range from about 500° C. to about 700° C.

8. A method in accordance with claim 5 wherein said thermal decomposition is carried out at a temperature in the range from about 580° C. to about 620° C.

9. A method for the preparation of thieno[2,3-c]-pyridine which comprises subjecting benzyl 2-(4-pyridyl) ethyl sulfide to thermal decomposition and recovering the resulting produced thieno[2,3-c]-pyridine.

10. A method in accordance with claim 9 wherein said thermal decomposition is carried out in the presence of hydrogen sulfide.

11. A method in accordance with claim 9 wherein said thermal decomposition is carried out at a temperature in the range from about 500° C. to about 700° C.

12. A method in accordance with claim 9 wherein said thermal decomposition is carried out at a temperature in the range from about 580° C. to about 645° C.

13. A method for the production of thieno[3,2-b]pyridine or thieno[2,3-c]pyridine which consists of subjecting benzyl 2-(2- or 4-pyridyl) ethyl sulfide to thermal decomposition at a temperature in the range from about 500° C. to about 700° C. in the presence of gaseous nitrogen and recovering the resulting produced thienopyridine.

References Cited

Hansch et al.: J. Org. Chem., vol. 23, pp. 1924–26, December 1958.

Klemm et al.: J. Org. Chem., vol. 25, pp. 1816–17, October 1960.

ALAN L. ROTMAN, Primary Examiner

U.S. Cl. X.R.

260—283, 999